(12) United States Patent
Wellington

(10) Patent No.: US 6,780,275 B2
(45) Date of Patent: Aug. 24, 2004

(54) METHOD OF PREPARING A DECORATIVE LAMINATED ARTICLE

(76) Inventor: Mary Boone Wellington, 141 Canal St., Nashua, NH (US) 03064

(*) Notice: Subject to any disclaimer, the term of this patent is extended or adjusted under 35 U.S.C. 154(b) by 0 days.

(21) Appl. No.: 10/419,366

(22) Filed: Apr. 21, 2003

(65) Prior Publication Data

US 2003/0178126 A1 Sep. 25, 2003

Related U.S. Application Data

(63) Continuation of application No. 09/584,280, filed on May 31, 2000, now Pat. No. 6,562,163.

(51) Int. Cl.⁷ .............................. B32B 31/00; B44C 1/20
(52) U.S. Cl. ................................................... 156/307.4
(58) Field of Search ............................ 156/63, 99, 100, 156/153, 307.4, 182, 37.4; 428/38, 203, 204

(56) References Cited

U.S. PATENT DOCUMENTS 4,787,837 A * 11/1988 Bell ........................... 425/385
6,364,992 B1 * 4/2002 Nambu et al. ............... 156/277
6,562,163 B1 * 5/2003 Wellington ................... 156/63

* cited by examiner

Primary Examiner—Richard Crispino
Assistant Examiner—Sing Po Chan
(74) Attorney, Agent, or Firm—Grossman, Tucker, Perreault & Pfleger, PLLC

(57) ABSTRACT

A transparent/translucent double-layer plastic sheet material which transmits light, comprising a pair of transparent/translucent sheet materials, wherein one side is of matte finish, the other side color coated, wherein the sheet materials are joined together with the matte finish facing outward.

3 Claims, No Drawings

METHOD OF PREPARING A DECORATIVE LAMINATED ARTICLE

CROSS REFERENCE TO RELATED APPLICATION

This application is a continuation of application Ser. No. 09/584,280, filed May 31, 2000 now U.S. Pat. No. 6,562, 163.

FIELD OF THE INVENTION

This invention relates to the preparation of decorative light-emitting plastic for the purpose of preparing unique ornamental designs for both residential and commercial applications. More particular, the invention herein relates to the use of generally transparent plastic material, uniformly colored on one side and protected, providing a unique back-lit illumination effect or unique decorative surface appearance as applied to a variety of artistic/decorative applications.

BACKGROUND OF THE INVENTION

The use of plastic material, and more specifically, transparent plastic material, for decorative applications, is well-known. Along such lines, acrylic materials, both in clear form and in solid color form, have been available for quite some time. For example, a "PLEXIGLAS" brand acrylic is a cast thermoplastic acrylic sheet produced in a number of formulations to provide specific physical properties for a number of applications. Along such lines, solid color translucent acrylic sheets are widely used in the illuminated sign industry. "PLEXIGLAS" is a registered trademark for such acrylic sheets of the Rohm and Haas Company. In addition, "LUCITE" acrylic sheets have been available from DuPont de Nemours & Co. Both brands of acrylic sheet have therefore found there way into decorative consumer products.

However, one long-standing problem with acrylic sheet is that such material is prone to scratching, and efforts have centered around the preparation of an acrylic based material that would be scratch-resistant. In that regard, abrasion resistant acrylic sheet has been made available where optical quality, cleanability, and long-term retention of properties is important. Such material has been offered by DuPont under the name "LUCITE SAR", which is said to comprise a cross-linked polysilicate resin to provide the acrylic sheet with a combination of properties including abrasion resistance, solvent resistance and weatherability. In addition, a product presumably offering similar characteristics is sold under the trademark "ACRIVUE" is available from Swedlow, Inc., Garden Grove, Calif.

The use of colorful and durable sheets of other non-acrylic materials as a surface for various articles of furniture also exists in the prior art. For example, the use of the well-known "FORMICA" brand laminate on counter tops is well known. In addition, other similar materials generally of a solid color, or of a marbled decorative pattern because of the nature of the process to form the laminate, have been used as a decorative outer layer for furniture or accessories.

It has, however, been difficult to produce a colorful, durable, and decorative transparent or translucent surfacing made from acrylic or polycarbonate sheets. This problem is largely founded on obstacles to patterning the coloring in a contemporaneous fashion and in a manner which is bright, lustrous, and resistant to fading, while at the same time exhibiting colors which are extraordinarily brilliant and exhibit an apparent depth which is attractive to the eye.

Along such lines, the painting of acrylic sheets with an acrylic lacquer is known in the prior art. Where acrylic paints have been applied to the outer surface of the acrylic sheet, such paints have been handpainted and highly rubbed to provide a brilliant, lustrous finish. Such processing, however, is time consuming and expensive. In addition, such articles have suffered from the problem of chipping, peeling and fading. Specifically, the backpainting of acrylic sheets with an acrylic lacquer is reported in U.S. Pat. No. 4,107,235 to DeWitt which discloses an acrylic coating composition for use in back-painting impact-resistant acrylic sheets for use as signs.

In addition, attention is directed at U.S. Pat. No. 4,293,603 which recites a method of making a laminate and articles of furniture wherein a transparent acrylic sheet is coated with an acrylic paint coating composition on one side in a predetermined color and decorative pattern. The coated sheet is then coated with an acrylic primer coating composition over the acrylic paint coating. The sheet is then adhesively secured to a backing member such as barrel board for fabrication into furniture.

In U.S. Pat. No. 5,480,698 there is disclosed a method of making a decorative laminated article comprising the steps of providing an acrylic sheet, and applying a clear urethane coating composition, and applying a water-based or latex color coating over the urethane coating and bonding the sheet to a backing member comprising a fiber composition.

However, upon review of all of the above, it becomes clear that none of these approaches of the prior art has been entirely satisfactory in at least three significant respects. The first relates to the depth, color and brilliance heretofore exhibited by painted acrylic lacquer sheets. The second relates to the ability to form patterns on the acrylic sheet of a contemporary design on a selective/custom basis for use in manufacturing contemporary back-lit sheeting designs thereby providing a "soft" lighting effect, entirely pleasing to the viewer, and of a quality and durability that has not yet been attainable. And finally, the third unresolved problem has been that the various surfaces that have been previously prepared, such as glossy, matte, or other type of texture has not been renewable if damaged by use or vandalism.

Thus it is a principal object of this invention to provide a transparent or translucent plastic material design, of layered construction, which is bright, lustrous, and resistant to fading and scratching, while at the same time being relatively inexpensive to manufacture and which maintains such properties as applied to either a commercial or residential design application.

It is also a further object of this invention to provide a transparent or translucent plastic material particularly suitable for back-lighting which again permits the use of color of extraordinary brilliance and depth, while at the same providing the colors with protection from chipping, peeling, and fading.

In addition, it is also an object of this invention to provide a durable and decorative transparent material for decorative applications, which is "double-sided" in the sense that it transmits different color patterns on each side of equivalent quality as in a "single-sided" configuration.

More specifically, it is an object of this invention to develop and apply a unique oil-based coating composition, and more specifically an alkyd-type mixture, combined with powdered pigments, that uniquely adheres to transparent or translucent plastic materials, to provide a vibrant yet pleasing color transmission for use in either a commercial or residential decorative application.

These and other objects of the invention will become apparent from a review of the detailed description of the invention which follows.

SUMMARY OF THE INVENTION

In product form, the invention first comprises a transparent/translucent plastic sheet material with a pair of opposed surfaces, wherein one surface is of a matte finish, and wherein the opposite surface is coated with a color coating composition. The aforementioned colored sheet material is adhered to another sheet material similarly coated, to provide a double-side product each with either the same or different color pattern, wherein the color patterns are protected by their back-to-back configuration. Each colored coating of such double-side product remains capable of a back-lighting effect.

In method form, the present invention relates to a method of preparing a decorative laminated article comprising the steps of:

(a) providing a first transparent/translucent plastic sheet with a pair of opposed surfaces (b) applying a matte finish to one surface of the transparent sheet (c) applying a color coating composition over that surface of the sheet that is not of a matte finish, wherein said color coating composition comprises a liquid based coating composition combined with a powdered pigment.

(d) repeating steps (a)–(c) above to produce a second transparent/translucent plastic sheet containing a matte finish and color coating and joining said first and second sheet with said matte finish of said sheets facing outward.

DETAILED DESCRIPTION OF THE PREFERRED EMBODIMENTS

An acrylic or polycarbonate composition sheet is preferred as the starting material for the present invention. The acrylic or polycarbonate sheet may be used in any thickness, but preferably 0.05–2.0 inch thickness sheet is employed. The acrylic or polycarbonate sheets can be either cast or extruded sheet However, in the broad context of the present invention, it can be appreciated that other transparent or translucent type plastic materials are suitable, provided they adhere to the oil-based/powdered pigment paint formulation as described herein. Along such lines, other transparent plastic include, but are not limited to polyester, polysulphone, poly-4-methyl-1-pentene, polyamide, and polyurethane type resins.

The acrylic or polycarbonate sheet is then sanded on one side to provide a matte finish. By such, it is meant that one surface of the sheet is made to provide a non-glossy or dull finish. However, the surface still remains translucent, such that light may pass through the sheet but the light is diffused so that objects on the other side cannot being distinguished. The preferred pattern is achieved by a electric or air-powered random orbit sander with a 0.18 inch orbit pattern and 80, 100 or 120 grit disks. Also contemplated herein is the use of larger orbit equipment that would provide a similar effect, but over a much shorter time period. In addition, as part of the method herein, the sanding machinery may be yoked together to increase production time. Also worthy of note is that during the sanding operation, a vacuum is applied to remove dust for safety, as well as for the purpose of maintaining an exposed surface for the sanding operation.

The non-sanded surface is then coated, which can be accomplished in any of the conventional ways of applying coatings, such as by brush, roller or by spray. Alternatively, the coating can be applied first, followed by sanding. In any event, in the context of the present invention it has been found preferable to apply the coating as noted above, and pat the surface using a pad made of cloth, plastic, and/or paper to even out the coverage and add texture.

With regards to the coating composition, broadly considered, either an alkyd oil based or latex based liquid coating composition is suitable. However, it is preferred herein to make use of an alkyd oil based liquid composition, and more preferably to combine such alkyd oil based liquid coating composition with a powdered pigment. In such regard, it has been found preferable to combine up to about 30% by weight powdered pigment with about 70% of an alkyd oil based liquid coating. However, in the broad context of the present invention, 1–25% of powdered pigment is combined with 99%–70% of the alkyd oil based coating, including increments of 1.0% therebetween. Accordingly, it can therefore be appreciated that a particularly preferred combination is about 10.0% by weight powdered pigment and 90.0% of the liquid alkyd oil based ingredient.

In addition, with respect to the liquid alkyd oil based ingredient, such is preferably prepared by combining an alkyd medium with an alkyd oil paint, wherein both products are available from Windsor Newton, the gel medium sold under the tradename "Liquin". In such regard, it has been found preferable to combine 1–99% of the alkyd medium with 99–1% of the alkyd oil paint, depending upon the particular color and intensity ultimately desired. That being the case, it can also be appreciated herein that in the final preferred embodiment, an alkyd medium is combined with an alkyd oil paint, along with powdered pigment, wherein the concentration of the three components are varied in accordance with the color intensity requirements of the final product. The powdered pigments used herein therefore include, but are not limited to, pearl white, iridescent gold, blue over green, green over gold, violate and blue interference powder, and are available from Central Art Supply of New York.

Although the preferred embodiment herein is a double-side application, wherein two transparent/translucent sheets, color coated as described above, are joined together with the matte side facing out, the invention herein also applies in a single sided application. In regards to such single sided applications which are not permanently affixed to a substrate material, which can be either fiberboard or wood, it has been found useful to apply a relatively thin (5–10 mil) backing of transparent sheet, such as polycarbonate, to the colored surface, to protect from damage. Alternatively, if the colored sheet material herein is to be glued to a substrate, it has been found preferable to coat the colored side with a water based latex primer to form a barrier between the colorant and any glue such as contact cement that may interact with, e.g., the preferred alkyd color coating.

Finally, as noted above, the present invention preferably makes use of an alkyd oil based medium for the unique color coating effect produced herein. Those skilled in the art will recognize that an alkyd oil based medium typically references a polyester type coating, modified by the addition of fatty acids derived from mineral and vegetable oils. However, in the broad context of the present invention, any oil based paint will operate, as well as latex type formulations, in combination with a powdered pigment, to provide the unique light-transmitting sheet materials described herein.

What is claimed is:

1. A method of preparing a decorative laminated article comprising the steps of:
   (a) providing a first transparent/translucent plastic sheet with a pair of opposed surfaces, said sheet having a thickness of about 0.05–2.0 inches,
   (b) applying a matte finish to one surface of said transparent/translucent sheet,
   (c) applying a color coating composition over the other surface of the first transparent/translucent plastic sheet, wherein said color coating composition comprises a liquid based coating composition combined with a powdered pigment, said coating composition comprising an alkyd based coating composition wherein said alkyd based composition is a mixture of about 70–99% (wt) alkyd oil based coating and 30–1% (wt) powdered pigment, wherein said alkyd based coating composition comprises supplying an alkyd oil based medium, supplying an alkyd oil paint and said powdered pigment and combining said medium, paint and powder to provide said alkyd coating composition,
   (d) providing a second transparent/translucent plastic sheet with a pair of opposed surfaces, wherein said second sheet has a thickness of about 0.005–0.02 inches; and
   (e) joining said first and second sheet together with said matte finish of said first sheet facing outward and with said color coating compositions facing inward wherein said color coating composition is in contact and adhered together with said second transparent/translucent plastic sheet and said color coating composition exhibits a back-lighting effect.

2. The method of claim 1 wherein said first transparent/translucent plastic sheet comprise poly(methyl methacrylate) or polycarbonate.

3. The method of claim 1 wherein one of said opposed surfaces of said second translucent/transparent plastic sheet is of a matte finish and joining said first and second sheet together with said matte finish of said first sheet facing outward and with said matte finish of said second sheet facing outward and with said color coating compositions facing inward wherein said color coating composition is in contact and adhered together with said second transparent/translucent plastic sheet and said color coating composition exhibits a back-lighting effect.

* * * * *